Patented Mar. 27, 1951

2,546,474

UNITED STATES PATENT OFFICE 2,546,474

PROCESS OF MANUFACTURING ASBESTOS-CONTAINING MATERIAL

Pierre Pascal Peyrot and Pierre Jean Chevalier, Lyon, France, assignors to Societe des Usines Chimiques Rhone-Poulenc, Paris, France, a French body corporate No Drawing. Application May 23, 1949, Serial No. 94,934. In France August 16, 1948

7 Claims. (Cl. 154—128)

This invention relates to new materials containing asbestos and to the production of such materials.

Agglomerates of substances such as asbestos or mica, sometimes containing fillers and held together by organic binders have frequently been used in the most diverse industries.

In order to improve these materials it has been proposed to use organosilicic resins as the binders since these are well known for their good resistance to heat and humidity, and for their high electrical insulating power. By "organosilicic resins" are meant the well-known resinous materials in which the organic radicles are directly attached to silicon atoms. Thus it has been proposed to steep asbestos in a solution of organosilicic resin, eliminate the solvent by evaporation and then heat the product to the insolubilisation temperature of the resin, so that the resin, after such heat-treatment is no longer soluble in the original resin solvents.

The products obtained by this well-known technique possess the qualities of asbestos, such as thermal insulation; however, they lack the mechanical strength which would permit their general use, for example their being worked with tools. The defects of asbestos, such as its power of absorbing water, are lessened by virtue of the water-repelling qualities of the organosilicic resin, but when these products are subjected for a long period to the action of a very humid atmosphere or are caused to undergo prolonged immersion, their electrical insulating properties are substantially reduced since they still absorb a considerable amount of water.

Applicants have now found that if asbestos is impregnated with an organosilicic resin and the whole is then subjected to considerably more energetic treatment than is sufficient merely to bring about the insolubilisation of the organosilicic resin, novel materials are obtained which, while very light, have excellent mechanical strength which is often characterised by a sonority similar to that of sheet metal. Further, they possess remarkable electrical properties which are retained substantially unimpaired despite the action of humidity and in addition they have very good resistance to high temperatures.

According to the present invention, therefore, a process for the production of materials containing asbestos comprises impregnating asbestos with an organo-silicic resin and heating the impregnated mass at a temperature substantially above that necessary merely to effect insolubilisation of the said resin.

The asbestos employed in the present invention may be in any convenient form, such as, for example, boards of pure asbestos or of asbestos which may include fillers and be agglomerated by organic binders, or may only include fillers, or may only be agglomerated; or asbestos fibres obtained, for example, by shredding an asbestos wad, or even asbestos wads employed as such, or else asbestos fabrics, or felts.

As organosilicic resins, use may be made of the most diverse organosilicic resins in respect of the degree of substitution or the nature of the organic radicles attached to the silicon. The best results have nevertheless been obtained with methylpolysiloxanic resins. It is preferable not to employ the resin dry, but in the form of a solution or a dispersion, in order to facilitate its homogeneous distribution over the asbestos.

The impregnation of the asbestos by the organosilicic resin may be effected, for example, by soaking the asbestos in a solution of organosilicic resin, by coating with a brush or spraygun, or by atomisation of the resin solution in an enclosure in which asbestos fibres are held in suspension by a blast of air. The amount of organosilicic resin absorbed by the asbestos may vary within wide limits, for example from 3 to 70% of the weight of the asbestos. Impregnation to any extent over this range can readily be effected by the techniques referred to above.

The insolubilisation of organosilicic resins is ordinarily effected by heating these resins to a temperature and for a period which are variable depending on the nature of the resin; but in the case of the resins most usually employed, insolubilisation is generally achieved by heating for 2 to 4 hours at temperatures between 150 to 250° C.

In accordance with the present invention the impregnated mass is subjected to the action of a temperature considerably higher than that necessary to effect merely the insolubilisation of the resin, or is subjected to the combined action of that high temperature and pressure. Thus, whereas insolubilisation is generally achieved between 150 to 250° C., with the usual heating times which are of several hours, the method of the present invention employs substantially higher temperatures, for example between 300 and 500° C., these temperatures being reached either gradually or by successive stages.

The improved products of the present invention may also be obtained by making use of the combined influence of temperature and pressure. Thus, agglomerates prepared by the absorption of resin by asbestos may be subjected to variable pressure, for example of from several kilograms to several tons per square centimetre. A suitable range is 40–500 kg./sq. cm. This pressure may be applied either before or during the baking. For example, asbestos impregnated with organosilicic resin may be pressed before subjecting it to the baking temperature. This treatment leads to products having very smooth surfaces, which are thus of better appearance and can be coated, after baking, with transparent, colourless or coloured coatings, and the like. Nevertheless, it is preferred to apply this process of applying pressure before the baking operation only to those materials which possess a certain mechanical rigidity, such as asbestos boards which have previously been charged with fillers or are already agglomerated by a binder.

The pressure may also be applied during the baking of the resin. This process then enables not only the agglomeration of previously charged or bound asbestos boards, but also that of "boards" of pure asbestos, that is to say masses in sheet form which do not present in themselves any mechanical rigidity. One advantageous form of the invention consists in operating in two stages, the first under pressure at the temperature of insolubilisation of the resin, and the second with or without pressure, at the elevated temperatures indicated above.

The amount of resin used plays an important part in the properties of the agglomerates obtained: agglomerates having a high resin content, for example of the order of half of the weight of the agglomerate or even more, have, other conditions being equal, superior qualities to those of agglomerates less rich in resin, particularly as regards electrical resistance and the absorption of water.

Excellent agglomerates can be obtained, even without subjecting them to the influence of pressure, provided they are heated long enough, or at an adequate temperature, and are prepared with a sufficiently high resin content. It is particularly remarkable, however, that it is possible to obtain agglomerates having good electrical resistivity and absorbing very little humidity, while containing very low proportions of organosilicic resin, for example much lower than 20% and even as low as 4% of the total weight of the agglomerates; it is sufficient to heat the latter to an adequate temperature, for example 300° C. to 500° C., while subjecting it to the effect of a high pressure, for example several hundred kilograms per square centimetre. It will be appreciated that this technique affords a considerable economic advantage, in view of the high price of organosilicic resins.

The agglomerates forming the object of the present invention are substantially insensitive to the action of humidity, even when prolonged. They have electrical properties which are remarkable for asbestos compounds: the dielectric strength attains very high values, which may exceed 10 kv. per mm. Their resistivity, which is ordinarily $10^9$ ohms per cm., may attain and exceed $10^{10}$ and $10^{11}$ ohms per cm., and is retained substantially unimpaired after a prolonged immersion in water or in humid conditions; exceptional resistance to arcing and to electrical discharge is also noted. These materials, although very light, have good mechanical properties, including their rigidity, which is frequently characterised by a sonority equivalent to that of a metal sheet; for this reason their general employment is possible, and they can be subjected to any machining operation. The mechanical rigidity and solidity of the materials of the invention can be further increased by means of a metal framework. For example it is possible during the baking to compress in sandwich form between two boards of asbestos impregnated with organosilicic resin a metal trellis-work, wire gauze, or metal grid and the resulting material acquires mechanical qualities comparable with those of metals in plates of similar thickness. The products can also be strengthened by similarly compressing, in sandwich form, two boards of asbestos impregnated with organo-silicic resin and an asbestos tissue, as glass tissue, or a superpolyamide tissue. The novel products are virtually incombustible materials; when brought to elevated temperatures they may, in certain cases, give rise to white flames of short duration and also to the superficial deposition of silica, due to the combustion or decomposition of the organosilicic resins, but their texture and their mechanical properties remain unchanged during long periods of heating. They scarcely transmit heat and therefore constitute preferred materials for resisting fire. In addition, they are not susceptible to putrefaction.

Thanks to the sum of their properties, the novel products of this invention find numerous applications in the electrical and radio-electrical industries. They are excellent insulators, insensitive to humidity; they can be varnished, for example by means of varnishes on a base of organosilicic resins, which, while providing decorative effects, permits a further improvement of their properties of superficial electrical resistance. Their lightness, combined with good mechanical properties, renders them particularly suitable for aircraft or ship-building. They are preferred materials for heat insulating purposes; fire-stop partitions may be made with simple panels, reinforced or otherwise, or with double or multiple panels, the intermediate space being filled with fireproof materials, such as slag wool, glass wool and the like.

The following examples serve to illustrate the invention but are not to be regarded as limiting it in any way:

*Example I*

A blue asbestos felt, not containing fillers, is soaked in a solution of methylsiloxanic resin of the ratio $CH_3:Si=1.2:1$. This solution is made in a mixture of solvents constituted by benzene and methyl alcohol, and its concentration is in the vicinity of 15% of dry resin. In these circumstances the amount of resin retained by the asbestos is of the order of 30% by weight. After 10 minutes soaking, evaporation is carried out in air for 1½ hours, and then for 2 hours in the stove in vacuo at 100° C.

With the agglomerate thus obtained, three samples are made. The first, which will serve as a control, is baked for two hours at 200° C. at a pressure of 40 kg./sq. cm., that is to say in conditions which effect only the insolubilisation of the resin. The second sample is baked for 2 hours at 300° C., at a pressure of 40 kg./sq. cm. The third sample is baked for 2 hours at 500° C., at a pressure of 40 kgs. per square centimetre.

After these treatments, the three samples are plunged for 24 hours into cold water, and then drained, and their resistivity is measured. The following figures are then obtained:

Ohms per cm.
Sample baked at 200° C. (control) ____ $3.6 \times 10^8$
Sample baked at 300° C. _____ $2.3 \times 10^9$
Sample baked at 500° C. _____ $1.6 \times 10^{10}$

*Example II*

An asbestos felt board is soaked in a solution of methyl-siloxanic resin such that the board retains an amount of solution corresponding to the resin/asbestos ratio of 7.5:100. Evaporation in air for 2 hours and preheating for 15 minutes at 100° C. are effected. Three samples prepared from this agglomerate are baked at a pressure of 40 kg./cm. the first sample (control) for 2 hours at 200° C., the second for 2 hours at 400° C., and the third for 2 hours at 500° C. The samples are soaked in water as in Example I, and the following values are obtained for resistivity.

Resistivity, ohms/cm.
Sample baked at 200° C. (control)
Less than $0.5 \times 10^7$
Sample baked at 400° C. _____ $3.2 \times 10^7$
Sample baked at 500° C. _____ $1.4 \times 10^9$

*Example III*

Asbestos wadding is impregnated by soaking in a 50% solution of a methylsiloxanic resin in a benzene-ethyl acetate mixture. The $CH_3:Si$ ratio of the resin is equal to 1.25:1. The solvent is evaporated by exposure to air for 2 hours and drying for three hours at 100° C. in vacuo. An agglomerate is obtained which contains equal parts of resin (calculated as dry product) and asbestos wadding.

The agglomerated wadding is then shredded mechanically in a small mill, which provides a product that can be kept in that form. This product is then moulded under high pressure at 100° C. and three samples are made therefrom.

The first sample (serving as control) is baked for 2 hours at 200° C. After cooling, it constitutes an agglomerate of poor mechanical behaviour and having no sonority to shock. The second sample is baked at 300° C., for one hour at a pressure of 50 kg./sq. cm., and the third sample is heated for 2 hours at 400° C. at a pressure of 500 kg./sq. cm. In the last two cases hard, very rigid agglomerates are obtained; the product from the third sample, in fact, has a sonority recalling that of an object of porcelain.

These three samples, subjected to the D495—42 arc resistance test of the American Standards of the A. S. T. M. (1947, 405), gave the following results:

Time, minutes
Sample No. 1 _____ 3
Sample No. 2 _____ 5
Sample No. 3 _____ 5

*Example IV*

An asbestos board strongly charged with fillers is impregnated with a 50% solution in ethyl acetate of a methyl-siloxanic resin in which the $CH_3:Si$ ratio is equal to 1.0:1. After evaporation at 100° C., various samples of this agglomerate are subjected to a pressure of 400 kg./sq. cm.

One sample, considered as a control, is baked for 2 hours at 200° C. After soaking for a whole night (12 hours) in water at room temperature, it is found that it has absorbed an amount of water representing 6% of its weight.

A second sample, heated for 2 hours at 400° C., yields an agglomerate having the sonority of sheet metal and, when soaked for a night (12 hours) in water at room temperature, absorbing no more than 1.5 to 2% of its weight of water.

We claim:

1. A process for the production of materials containing asbestos which comprises impregnating asbestos with methylsiloxanic resin and heating the impregnated mass at a temperature of 300–500° C.

2. A process for the production of materials containing asbestos which comprises impregnating asbestos with methylsiloxanic resin and heating the impregnated mass at a temperature of 300–500° C., at a pressure of 40 to 500 kg./sq. cm.

3. A process for the production of materials containing asbestos which comprises impregnating asbestos with methylsiloxanic resin, heating the impregnated mass at the temperature at which insolubilisation of the resin occurs and at a pressure of 40 to 500 kg./sq. cm., and thereafter heating the agglomerated mass at a temperature of 300–500° C.

4. A process for the production of materials containing asbestos which comprises impregnating asbestos with methylsiloxanic resin, heating the impregnated mass at the temperature at which insolubilisation of the resin occurs and at a pressure of 40 to 500 kg./sq. cm., and thereafter heating the agglomerated mass at a temperature of 300–500° C., at a pressure of 40 to 500 kg./sq. cm.

5. A process for the production of materials containing asbestos which comprises impregnating asbestos with methylsiloxanic resin to produce a mass containing 3 to 70% of resin by weight, and heating the impregnated mass at a temperature of 300–500° C., at a pressure of 40 to 500 kg./sq. cm.

6. A process for the production of materials containing asbestos which comprises impregnating asbestos with methylsiloxanic resin to produce a mass containing 3 to 70% of resin by weight, heating the impregnated mass at the temperature at which insolubilisation of the resin occurs and at a pressure of 40 to 500 kg./sq. cm., and thereafter heating the agglomerated mass at a temperature of 300–500° C.

7. A process for the production of materials containing asbestos which comprises impregnating asbestos with methylsiloxanic resin to produce a mass containing 3 to 70% of resin by weight, heating the impregnated mass at the temperature at which insolubilisation of the resin occurs and at a pressure of 40 to 500 kg./sq. cm., and thereafter heating the agglomerated mass at a temperature of 300–500° C., at a pressure of 40 to 500 kg./sq. cm.

PIERRE PASCAL PEYROT.
PIERRE JEAN CHEVALIER.

REFERENCES CITED

The following references are of record in the file of this patent:

UNITED STATES PATENTS

| Number | Name | Date |
|---|---|---|
| 2,258,220 | Rochow | Oct. 7, 1941 |
| 2,371,050 | Hyde | Mar. 6, 1945 |